United States Patent
Kennedy et al.

(10) Patent No.: US 8,271,102 B2
(45) Date of Patent: Sep. 18, 2012

(54) CONTROL OF CONCEPT ZONES

(75) Inventors: Magnus Kennedy, Sövde (SE); Kevin Sweeney, North Andover, MA (US); Jon Williamson, Newburyport, MA (US)

(73) Assignee: Schneider Electric Buildings AB, Malmo (SE)

( * ) Notice: Subject to any disclaimer, the term of this patent is extended or adjusted under 35 U.S.C. 154(b) by 457 days.

(21) Appl. No.: 12/544,438

(22) Filed: Aug. 20, 2009

(65) Prior Publication Data

US 2010/0070055 A1    Mar. 18, 2010

(30) Foreign Application Priority Data

Sep. 18, 2008  (EP) .................................. 08164596

(51) Int. Cl.
*G05B 19/18*     (2006.01)
*G05B 11/01*     (2006.01)
*G05B 15/00*     (2006.01)

(52) U.S. Cl. .................. 700/17; 700/2; 700/18; 700/19; 700/20; 700/83

(58) Field of Classification Search .................. 700/86, 700/2, 17–20, 83; 713/2, 100
See application file for complete search history.

(56) References Cited

U.S. PATENT DOCUMENTS

| | | | |
|---|---|---|---|
| 5,586,305 A * | 12/1996 | Eidson et al. ................... | 703/11 |
| 5,909,368 A * | 6/1999 | Nixon et al. ..................... | 700/2 |
| 6,104,963 A * | 8/2000 | Cebasek et al. ................ | 700/86 |
| 6,185,466 B1 * | 2/2001 | Nicewonger .................... | 700/19 |
| 6,195,591 B1 * | 2/2001 | Nixon et al. .................... | 700/83 |
| 6,205,362 B1 * | 3/2001 | Eidson .............................. | 700/4 |
| 6,832,120 B1 * | 12/2004 | Frank et al. ...................... | 700/65 |
| 6,901,439 B1 * | 5/2005 | Bonasia et al. ............... | 709/220 |
| 6,909,921 B1 | 6/2005 | Bilger | |
| 7,272,452 B2 * | 9/2007 | Coogan et al. .................. | 700/19 |
| 7,349,761 B1 * | 3/2008 | Cruse ............................ | 700/276 |
| 7,437,596 B2 * | 10/2008 | McFarland ................... | 714/47.2 |
| 7,464,339 B2 * | 12/2008 | Keenan et al. ................ | 715/762 |
| 7,734,572 B2 * | 6/2010 | Wiemeyer et al. ............. | 700/19 |
| 7,774,441 B2 * | 8/2010 | Frutiger et al. ............... | 709/221 |
| 8,013,732 B2 * | 9/2011 | Petite et al. ................. | 340/539.1 |
| 2002/0016639 A1 | 2/2002 | Smith et al. | |
| 2005/0033453 A1 * | 2/2005 | Coogan et al. .................... | 700/2 |
| 2007/0043476 A1 * | 2/2007 | Richards et al. ............. | 700/276 |
| 2007/0100479 A1 | 5/2007 | Ahmed | |
| 2009/0177298 A1 * | 7/2009 | McFarland et al. ............. | 700/90 |

FOREIGN PATENT DOCUMENTS

WO    WO 96/22668    7/1996

OTHER PUBLICATIONS

European Search Report for 08164596.2 completed Feb. 11, 2009.

* cited by examiner

*Primary Examiner* — Ronald Hartman, Jr.
(74) *Attorney, Agent, or Firm* — Buchanan Ingersoll & Rooney

(57) ABSTRACT

There is provided a method, apparatus and computer program product for controlling parameters of objects in a building control system, the method comprising receiving input from at least one of the objects, wherein the at least one object is associated with a first subset of objects; selecting at least one parameter, wherein the at least one parameter depends on the input; selecting a second subset of objects from the objects, wherein the objects of the second subset are selected based on the at least one selected parameter; and performing a first action on objects in the second subset of objects.

17 Claims, 9 Drawing Sheets

CONTROL OF CONCEPT ZONES

TECHNICAL FIELD

The present invention relates generally to a building control system. More particularly, this invention relates to a method, apparatus and a computer program for controlling parameters of objects in a building control system.

BACKGROUND

It is common to control different systems, such as control systems for heating, ventilation and air conditioning (HVAC), security, electronic access control (EAC), lighting, asset management or other facility management control systems, in various kinds of buildings.

Traditionally the HVAC, security, EAC, lighting, asset management and facility management functionalities have been controlled by separate, and hence function-based, control systems. Typically the separate control systems have been kept independent of each other. That is, all control devices associated with HVAC functionalities have been comprised in a first control system whereas all control devices associated with EAC functionalities have been comprised in a second control system. The separate control systems have often been monitored by one or more operators.

However, recently control systems linking together different control functionalities have been proposed.

International patent application WO96/22668 discloses a method of providing sensor inputs to detect occupancy in the controlled area. The method provides control signals to the lighting control system and the control signals are used to reduce the light level or turn light fixtures off at times when the area is not occupied. WO96/22668 further discloses an energy saving lighting control system for operating fluorescent light fixtures. Means for controlling the light level according to the light required for the task being done in the area is provided. A method of providing a central control of the operation of the lighting system is also provided.

However there is still need for an improved control system capable of integration of different control functionalities.

SUMMARY OF THE INVENTION

Even though prior art is capable of directing control signals from one control system to another, the control systems are per se not associated with each other but only act as separated systems. It is desirable to provide an improved connection between individual control devices and subsets of control devices. It is thus desirable to form flexible subsets of control devices. It is also desirable to form flexible associations between control systems in order to efficiently distribute control signals from one system to another.

In view of the foregoing, it is thus an object of the present invention to provide an improvement of the prior art. It is one object to provide a method, apparatus, and a computer program to facilitate the deployment of a new control device in an existing control system. It is one object to provide a method, apparatus, and a computer program to improve communications in a control system. More particularly, it is an object to provide a method, apparatus, system and a computer program for controlling parameters of objects in a building control system.

Hence, according to a first aspect a method is provided for controlling parameters of objects in a building control system, wherein the method comprises receiving input from at least one of the objects, wherein the at least one object is associated with a first subset of objects; selecting at least one parameter, wherein the at least one parameter depends on the input; selecting a second subset of objects from the objects, wherein the objects of the second subset are selected based on the at least one selected parameter; and performing a first action on objects in the second subset of objects. A first advantage of the disclosed method is that output signals from several objects may be associated. A second advantage of the disclosed method is that input signals to several objects may be associated. The disclosed method thus provides for improved communication in a building control system.

The method may further comprise extracting an object property of the second subset of objects; adding a new object to the second subset of objects; and setting at least one object property of the new object to be equal to the extracted object property. Thus the disclosed method may provide for simple installation of new objects in an existing second subset of objects in a building control system.

The method may further comprise extracting an object property of the first subset of objects; adding a new object to the first subset of objects; and setting at least one object property of the new object to be equal to the extracted object property. Thus the disclosed method may provide for simple installation of new objects in an existing first subset of objects in a building control system.

The at least one object property may pertain to at least one from the group of an object input signal and an object output signal.

Performing the first action may further comprise selecting the first action. Selecting the first action may depend on the input.

The first action may comprise assigning a value to an output of the at least one object in the second subset of objects.

The method may further comprise performing a second action on at least one object in the second subset of objects. The second action may be different from the first action. Thus the disclosed method may enable different actions to be performed on the same or different objects in the second subset. The disclosed method may therefore enable integration of different types of control functionalities.

The at least one object may be associated with the first subset by at least one property from the group of geographic location, and control functionality.

The control functionality may pertain to at least one from the group of heating ventilation and air conditioning, electronic access control, and intrusion detection functionality.

Each object may be associated with a control device. The disclosed method may thus enable improved installation of new control devices in an existing system of control devices.

According to a second aspect there is provided an apparatus for controlling parameters of objects in a building control system, comprising a receiver for receiving input from at least one of the objects, wherein the at least one object is associated with a first subset of objects; a processor for selecting at least one parameter, wherein the at least one parameter depends on the input; the processor is further configured to selecting a second subset of objects based on the at least one selected parameter; and the processor is further configured to performing a first action on objects in the second subset of objects.

The processor may further be configured to extracting an object property of the second subset of objects. The processor may further be configured to detecting presence of a new object in the second subset of objects. The processor may further be configured to defining at least one object property of the new object to be the extracted object property.

The processor may further be configured to extracting an object property of the first subset of objects. The processor may further be configured to detecting presence of a new object in the first subset of objects. The processor may further be configured to defining at least one object property of the new object to be the extracted object property.

The apparatus may further comprise a user input receiver for receiving input from a user, wherein the input pertains to the selecting the parameter. The user input receiver may further be configured to providing the processor with instructions to select the parameter. The disclosed apparatus may provide for simplified installation of new objects in an existing set of objects. The disclosed apparatus may be provided with a user interface. The disclosed apparatus may provide for improved monitoring of a control system.

According to a third aspect there is provided an apparatus for controlling parameters of objects in a building control system, comprising a receiver for receiving input, wherein the input pertains to an object property of the apparatus; a processor for defining at least one object property of the apparatus to take the value of the extracted object property. Thus the disclosed apparatus may provide for simple installation of new objects in an existing first subset of objects in a building control system.

The input may be based on the object property of at least one additional object in the building control system.

According to a fourth aspect of the invention, there is provided a computer program stored on a computer readable medium, which comprises software instructions that, when executed in a computer, performs a method for controlling parameters of objects in a building control system.

Such a computer program enables for efficient implementation of the method for controlling parameters of objects in a building control system as disclosed above.

The second, third and fourth aspects may generally have the same features and advantages as the first aspect Generally, all terms used in the claims are to be interpreted according to their ordinary meaning in the technical field, unless explicitly defined otherwise herein. All references to "a/an/the [device, event, message, alarm, parameter, step etc.]" are to be interpreted openly as referring to at least one instance of said device, event, message, alarm, parameter, step etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described, by way of example, with reference to the accompanying schematic drawings, in which.

DETAILED DESCRIPTION OF PREFERRED EMBODIMENTS

Figure 1A:
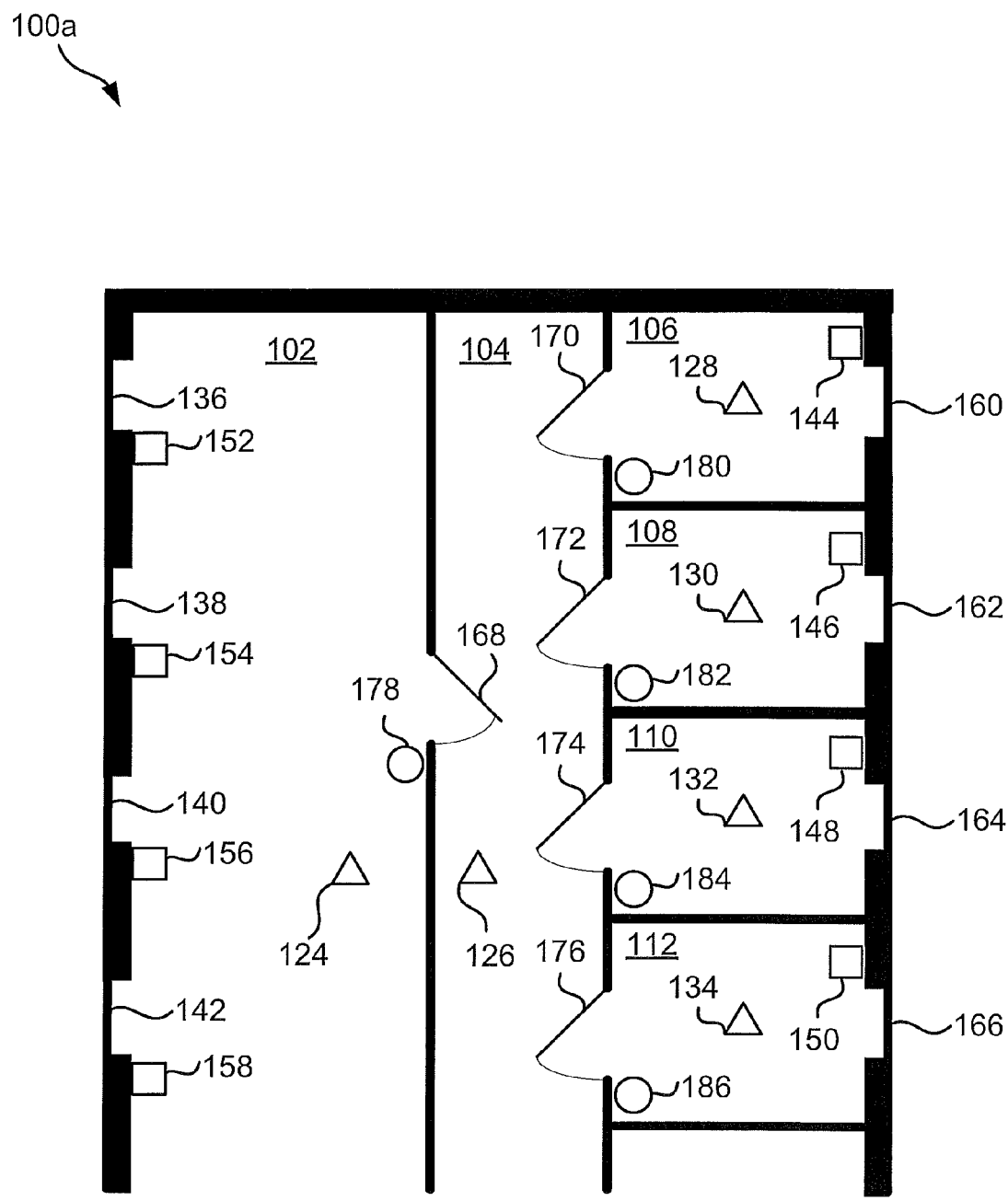
FIG. 1a is a schematic view of a floor plan with control devices according to an embodiment.

FIG. 1a depicts a schematic view of a floor plan 100a comprising a plurality of control devices 124, 126, 128, 130, 132, 134, 144, 146, 148, 150, 152, 154, 156, 158, 178, 180, 182, 184, 186 according to an embodiment.

The floor plan 100a comprises a number of rooms 102, 104, 106, 108, 110, 112, which may inter alia illustrate the layout of a floor plan of an office, a factory, or a residential building. In the illustrative example of FIG. 1a the rooms are interconnected by doors 168, 170, 172, 174, 176. Some of the rooms of the floor plan 100 may comprise one or more windows 136, 138, 140, 142, 160, 162, 164, 166.

The control devices 124, 126, 128, 130, 132, 134, 144, 146, 148, 150, 152, 154, 156, 158, 178, 180, 182, 184, 186 may be associated with one or more control functionalities for heating, ventilation and air conditioning (HVAC), security, electronic access control (EAC), lighting, asset management, or the like.

The control devices may be arranged to receive one or more input signals. The control devices may be arranged to transmit one or more output signals. The control devices may be associated with sensors. The sensors may be temperature sensors, light sensors, motion detectors, intrusion detectors, or the like.

Each control device may be associated with at least one object. Each of the at least one object of the control device may pertain to a control functionality of the control device. Each of the at least one object of the control device may be associated with at least one parameter. The at least one parameter may pertain to a control functionality of the control device associated with the object. The at least one parameter may pertain to location information of the control device associated with the object.

That is, each control device may be associated with a plurality of control functionalities. However, for simplicity reasons and without losing generality, below only the case in which each control device is associated with one object will be discussed.

The control functionalities may further be associated with the rooms 102, 104, 106, 108, 110, 112, the windows 136, 138, 140, 142, 160, 162, 164, 166 and/or the doors 168, 170, 172, 174, 176 of the building.

The control devices with reference numerals 124, 126, 128, 130, 132, 134 may be associated with one or more HVAC, EAC and/or security functionality of the rooms 102, 104, 106, 108, 110, 112. For example, the control device 124 may be associated with one or more HVAC, EAC and/or security functionality of the room 102, and so on. For example, in case the control device 124 is associated with a HVAC functionality the control device 124 may receive a temperature set-point and/or control signal from a local or central control apparatus or from an operator, which temperature set-point and/or control signal may pertain to a desired temperature of the room 102. Likewise, the control device 124 may receive an actual temperature value from a sensor associated with a HVAC apparatus in the room 102.

The control devices with reference numerals 144, 146, 148, 150, 152, 154, 156, 158 may be associated with one or more HVAC, EAC and/or security functionality of the windows 160, 162, 164, 166, 136, 138, 140, 142. For example, the control device 144 may be associated with one or more HVAC, EAC and/or security functionality of the window 160, and so on. For example, in case the control device 144 is associated with an intrusion functionality the control device 144 may receive an intrusion detection signal from the window 160. The intrusion detection signal may e.g. pertain to an alarm signal triggered by a motion detector or a glass breaking sensor associated with the window 160.

The control devices with reference numerals 178, 180, 182, 184, 186 may be associated with one or more HVAC, EAC or security functionality of the doors 168, 170, 172, 174, 176. For example, the control device 178 may be associated with one or more HVAC, EAC and/or security functionality of the door 168, and so on. For example, in case the control device 178 is associated with an EAC functionality the control device 178 may receive and/or transmit information pertaining to an identity of a person wishing to pass through the door 168.

Each room 102, 104, 106, 108, 110, 112 may define a first control zone. Each floor in the building may define a second control zone. Each building in a system of buildings may define a third control zone. Each control functionality (HVAC, security, EAC, lighting, asset management, or the like) may define additional control zones. That is, each control device may be associated with a plurality of different control zones. Each control zone comprises at least one control device. Further, each zone may comprise control devices associated with different control functionalities.

Figure 1B:
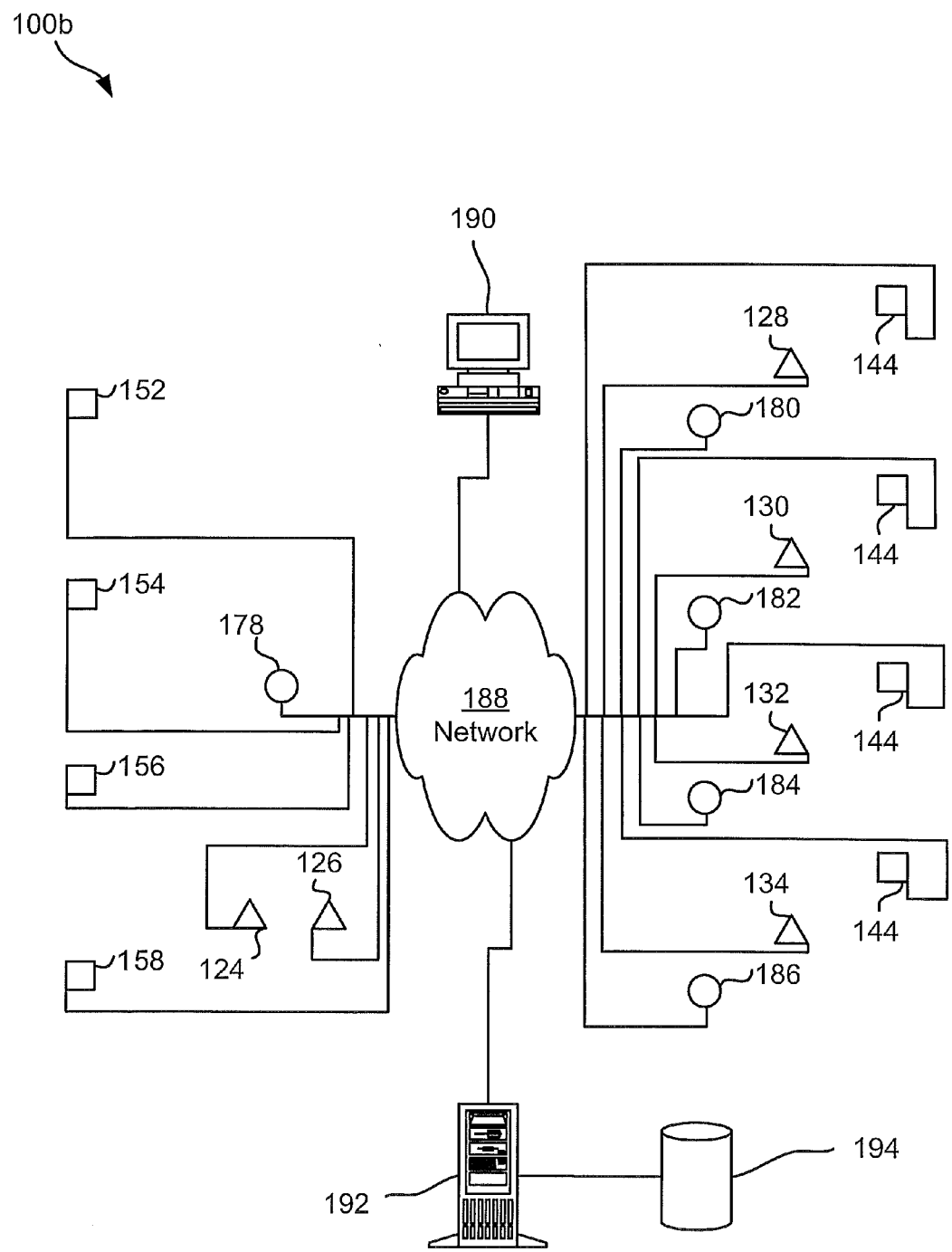
FIG. 1b is a schematic view of a building control system according to an embodiment.

FIG. 1b is a schematic view of a building control system 100b according to an embodiment. The system 100b will be described in an operating state. The system 100b comprises a computer server 192 operatively connected to a database 194. The computer server 192 is further operatively connected to a communications network 188. The communications network 188 may be an internal network (a so called Intranet) of an office, a residential flat, a building, a collection of buildings, a company, a business enterprise, or the like. The communications network 188 may also be a wide area network. The communications network 188 may be wired, wireless, or any combinations thereof.

The building control system 100b further comprises a plurality of control devices 124, 126, 128, 130, 132, 134, 144, 146, 148, 150, 152, 154, 156, 158, 178, 180, 182, 184, 186. In the illustrative example of FIG. 1b the plurality of control devices 124, 126, 128, 130, 132, 134, 144, 146, 148, 150, 152, 154, 156, 158, 178, 180, 182, 184, 186 correspond to the plurality of control devices 124, 126, 128, 130, 132, 134, 144, 146, 148, 150, 152, 154, 156, 158, 178, 180, 182, 184, 186 of FIG. 1a as disclosed above.

In the example of FIG. 1b each one of the plurality of control devices is operatively connected to the communications network 188. The communications network 188 may thus facilitate the transmission of control signals between the plurality of control devices.

One or more computers 190 may also be operatively connected to the communications network 188. The one or more computers 190 may be able to access content stored on the computer server 192 and/or the database 194. The computer 190 may thus be utilized to monitor and/or control the building control system 200. The computer 190 may be arranged to be at least partly operated by an operator or service person. The computer 190 may be arranged to at least partly automatically monitor and/or control the building system 100b.

It should be noted that according to some embodiments the building control system 100b does not need to comprise a central computer server, such as the central computer server 192. Instead the building control system 100b may be embodied as a de-centralized building control system, wherein one or more of the plurality of control devices 124, 126, 128, 130, 132, 134, 144, 146, 148, 150, 152, 154, 156, 158, 178, 180, 182, 184, 186 may be configured to facilitate management, including monitor and/or control, of the system 100b.

Figure 2A:
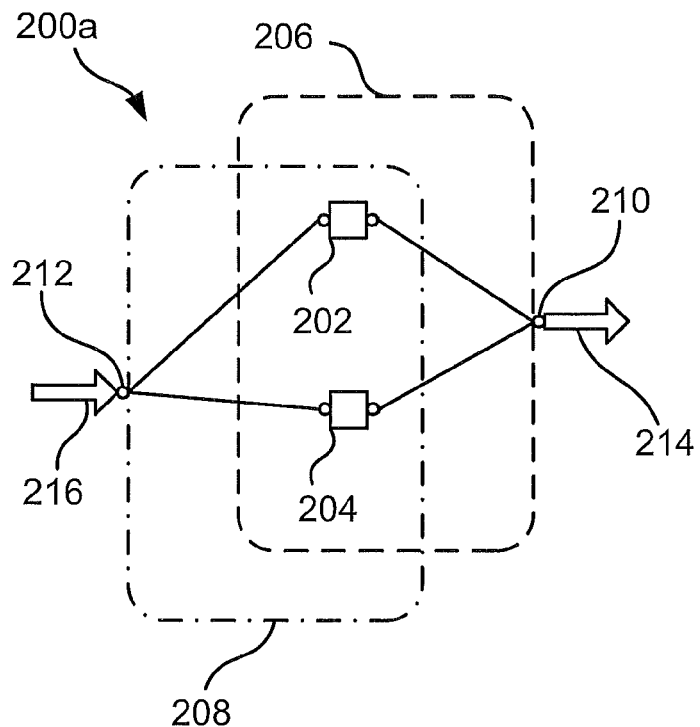
FIG. 2a is a schematic view of control devices according to an embodiment.

FIG. 2a is a schematic view of a control system 200a comprising control devices 202, 204. The control devices 202, 204 may be similar to the control devices 124, 126, 128, 130, 132, 134, 144, 146, 148, 150, 152, 154, 156, 158, 178, 180, 182, 184, 186 of FIGS. 1a and 1b as disclosed above.

Each one of the control devices 202, 204 is associated with at least one subset of control devices. In the exemplary control system 200a each control device 202, 204 is associated with a first subset 206 of control devices. The first subset 206 is associated with output signals of the control devices 202, 204 as indicated by the binding point 210 operatively connecting the control devices 202, 204 with an illustrative common output terminal of the first subset. The output of the first subset is indicated by the illustrative arrow 214. The output signal may pertain to at least one property of the control devices 202, 204. The property may pertain inter alia to HVAC, security, EAC, facility management functionalities, or the like. For example, one property may pertain to a temperature value sensed by a sensor associated with the control device 202, 204. In case said temperature value is below a pre-defined threshold the output may be set to a logic one, otherwise the output may be set to a logic zero. For example, a second property may pertain to a movement detected by a motion detector associated with the control device 202, 204. In case said motion detector detects a motion the output may be set to a logic one, otherwise the output may be set to a logic zero.

Similarly, each control device 202, 204 in FIG. 2a is associated with a second subset 208 of control devices. The second subset 208 is associated with input signals to the control devices 202, 204 as indicated by the binding point 212 operatively connecting the control devices 202, 204 with an input to the second subset. The input to the second subset is indicated by the illustrative arrow 216. The input signal may define one or more actions to be performed by the control devices 202, 204. One action may pertain inter alia to HVAC, security, EAC, facility management functionalities, or the like. The action to be perform may depend on the type of control device. Thus a single input signal received at the binding point 212 may result in different actual actions being performed by the control devices 202, 204. For example, one action may pertain to control of a radiator associated with the control device 202, 204. In case said input is a logic one the radiator may be switched on, otherwise the radiator may be switched off. For example, the action may pertain to control of a door associated with the control device 202, 204. In case said input is a logic one the door may be locked, otherwise the door may be un-locked. As is understood by the skilled person these are just a few illustrative examples provider in order to improve the understanding of the disclosed control system.

The output of the first subset may thus define one or more parameters. The one or more parameter may be utilized when defining on which control devices the action is to be performed. The one or more parameters may thus be said to define one or more parameters of a logic filter. The logic filter may thus define which signals that will be effected, whereas the action defines the behaviour. In other words, the logic filter may be utilized to select signals of importance. The logic filter may utilize string matching and/or type matching. The logic filter may have multiple levels. The logical filter may allow for different logical conditions. The logic filter may be generated by an operator.

As mentioned above the one or more parameter may be utilized to define which action from a set of possible actions to be performed. The action may pertain to a number of steps to be executed. The action may thus be said to define an algorithm. Thus by associating each control device 202, 204 with at least a first subset 206 and a second subset 208, facilitation of improved automatic control of the control system may be achieved.

As disclosed above each control device 202, 204 may be associated with an object. Thus since the control devices 202, 204 define subsets the corresponding objects may also define corresponding subsets. Each subset of objects, such as the subsets 206, 208, may thus define a concept zone. The term "concept zone" is introduced in order to distinguish the herein disclosed control systems from control systems wherein zones are defined by location (i.e. positional) means only. A concept zone may thus denote a subset of objects associated with common location information, such as a room or a building as well as common control functionality, such as HVAC, security, EAC, facility management, or the like. A concept zone may thus comprise multiple objects of different types. In other words, a concept zone may comprise occupancy sensors, fan coil units, doors, or the like. Objects may be associated with one or more concept zones automatically when the associated control device is installed into the control system. Alternatively, objects may be associated with one or more concept zones by an operator. Alternatively objects may be associated with one or more concept zones during fabrication of the associated control device.

In addition, as also stated above, each object is associated with at least one parameter. Each subset of control devices may therefore be associated with a plurality of parameters, wherein the parameters are defined by the objects comprised in the subset. Likewise, the parameters may be utilized to define objects in the subset. Thus the parameters may define subsets of the control devices.

The first subset and the second subset may be at least partly overlapping. Alternatively the first subset and the second subset may be disjoint. In the exemplary control system 200a of FIG. 2a the first subset 206 and the second subset 208 are overlapping.

Figure 2B:
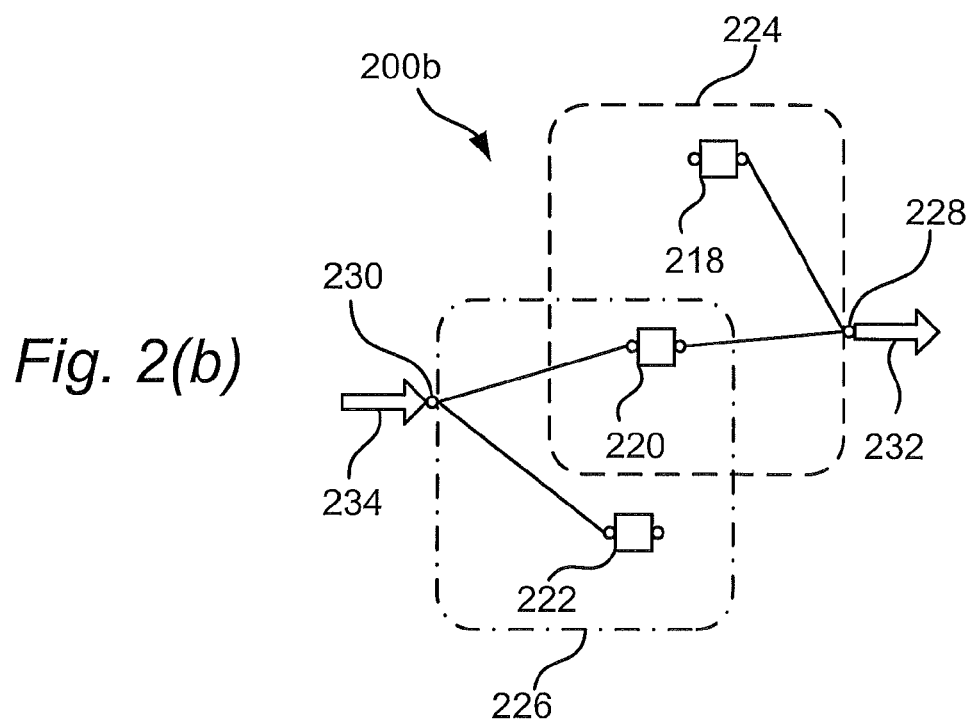
FIG. 2b is a schematic view of control devices according to an embodiment.

FIG. 2b is a schematic view of a control system 200b similar to the control system 200a of FIG. 2a, wherein the control system 200b comprises control devices 218, 220 and 222. The control devices 218 and 220 are associated with a first subset 224. The control devices 220 and 222 are associated with a second subset 226. Thus the first subset 224 and the second subset 226 are partly overlapping. Furthermore, the control devices 218 and 220 are associated with a common binding point 228 associated with the output of the first subset 224. The output of the first subset is indicated by the illustrative arrow 232. The control devices 220 and 222 are associated with a common binding point 230 associated with the input to the second subset 226. The input to the second subset is indicated by the illustrative arrow 234.

Figure 2C:
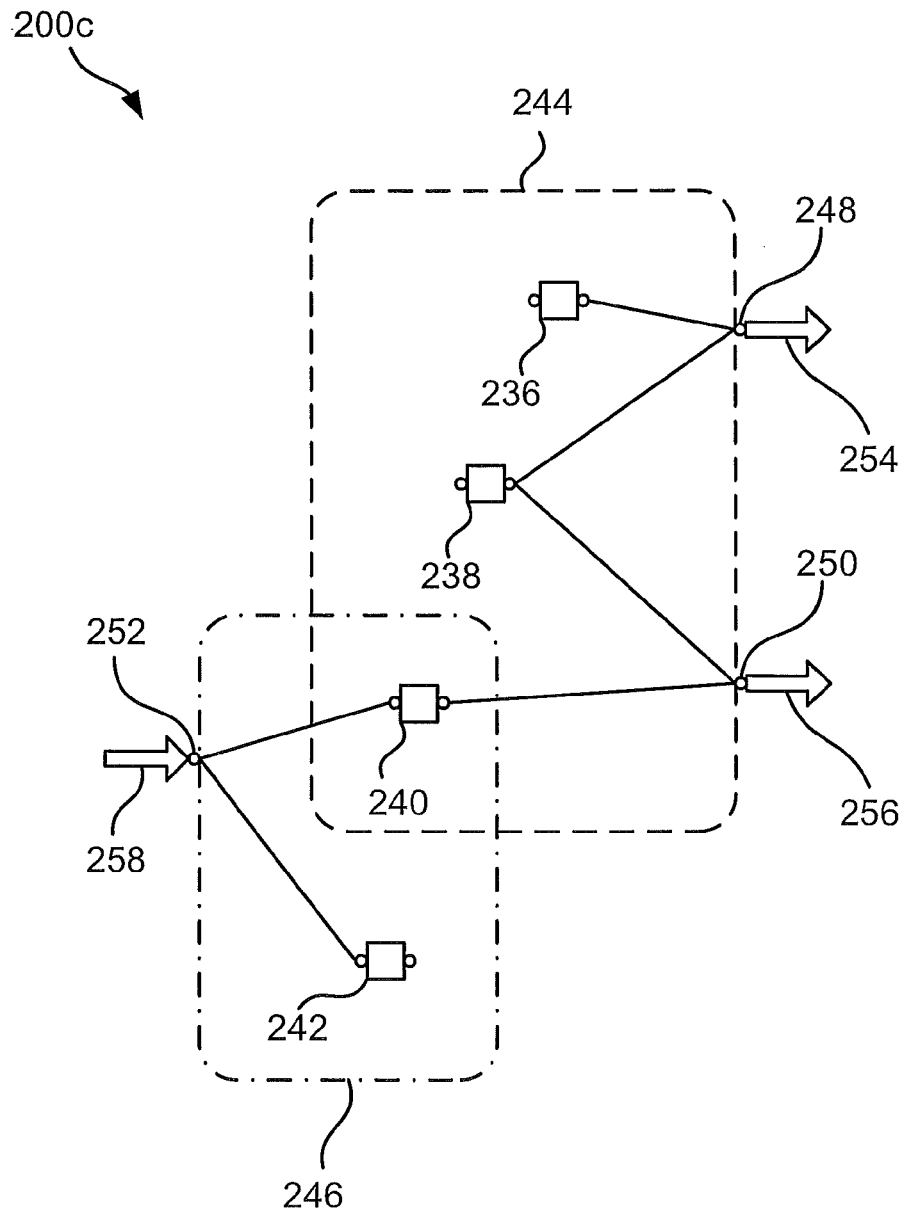
FIG. 2c is a schematic view of control devices according to an embodiment.

FIG. 2c is a schematic view of a control system 200c similar to the control systems 200a of FIGS. 2a and 200b of FIG. 2b, wherein the control system 200c comprises control devices 236, 238, 240 and 242. Control devices 236, 238 and 240 are associated with a first subset 244 and control devices 240 and 242 are associated with a second subset 246. Thus the first subset 244 and the second subset 246 are partly overlapping.

The first subset 244 is further associated with two outputs, as indicated by the binding points 248 and 250, respectively. The output of the first subset is indicated by the illustrative arrows 254 and 256, respectively. The first output 254 may pertain to a first HVAC functionality associated with the control devices 236 and 238 whereas the second output 256 may be associated with a second HVAC functionality associated with the control devices 238 and 240. The control devices 240 and 242 are associated with a common binding point 252 associated with the input to the second subset 246. The input to the second subset is indicated by the illustrative arrow 258.

Figure 2D:
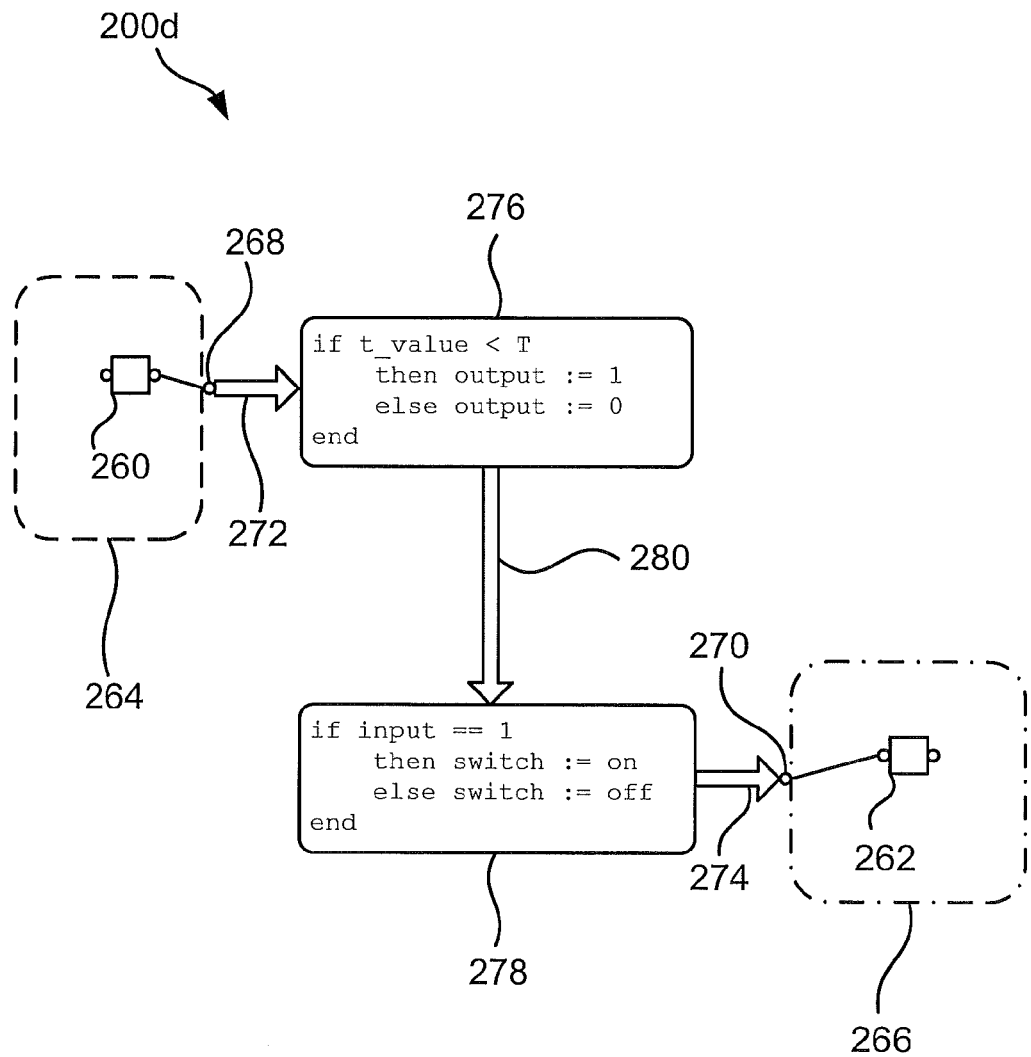
FIG. 2d is a schematic view of control devices according to an embodiment.

FIG. 2d is a schematic view of a control system 200d similar to the control systems 200a of FIG. 2a, 200b of FIGS. 2b and 200c of FIG. 2c, wherein the control system 200d comprises control devices 260 and 262. Control device 260 is associated with a first subset 264 and control device 262 is associated with a second subset 266. Thus the first subset 264 and the second subset 266 are disjoint. The first subset 264 is further associated with an output, as indicated by the binding point 268. The output of the first subset is indicated by the illustrative arrow 272. In the illustrative example of FIG. 2d the output behaviour is illustrated by the pseudo-code 276. Thus the output pertains to the parameter "t_value". That is, if "t_value" is smaller than a given parameter "T" the output value is set to 1. Else the output value is set to 0.

For example the parameter "value" may pertain to a temperature value received by the control devices 260 and "T" may be a predefined temperature threshold. In general the output value of the first set 264 is a function of parameters and signals from the control device(s) associated with said first set 264. The binding point 268 may thus be associated with the parameter "t_value".

The output value may be transmitted to at least one receiving second subset, as indicated by the arrow 280. The output value may be directly transmitted to an input of a second subset. Alternatively the output value may be transmitted through a network, such as the network 188 of FIG. 1b.

As stated above the one or more parameters may define one or more parameters of a logical filter. The logical filter may thus determine to which second subset(s) the information should be transmitted to. In the illustrative example of FIG. 2d the logical filter transmits the output of the first subset 276 to all second subsets, such as the subset 266, being associated with the parameter "t_value".

In the illustrative example of FIG. 2d the input behaviour, or action to be performed on the control device(s) of the second subset 266 is illustrated by the pseudo-code 278. Thus if the input takes the value "1" a "switch" should take the value "on". Else the "switch" should take the value "off". In general the output value of the first set 264 is a function of parameters and signals from the control device(s) associated with said first set 264. The input behaviour is then communicated to the control device(s) associated with the second subset, as illustrated by the input arrow 274 and the binding point 270 operatively connecting the input to the control device 262.

Figure 3A:
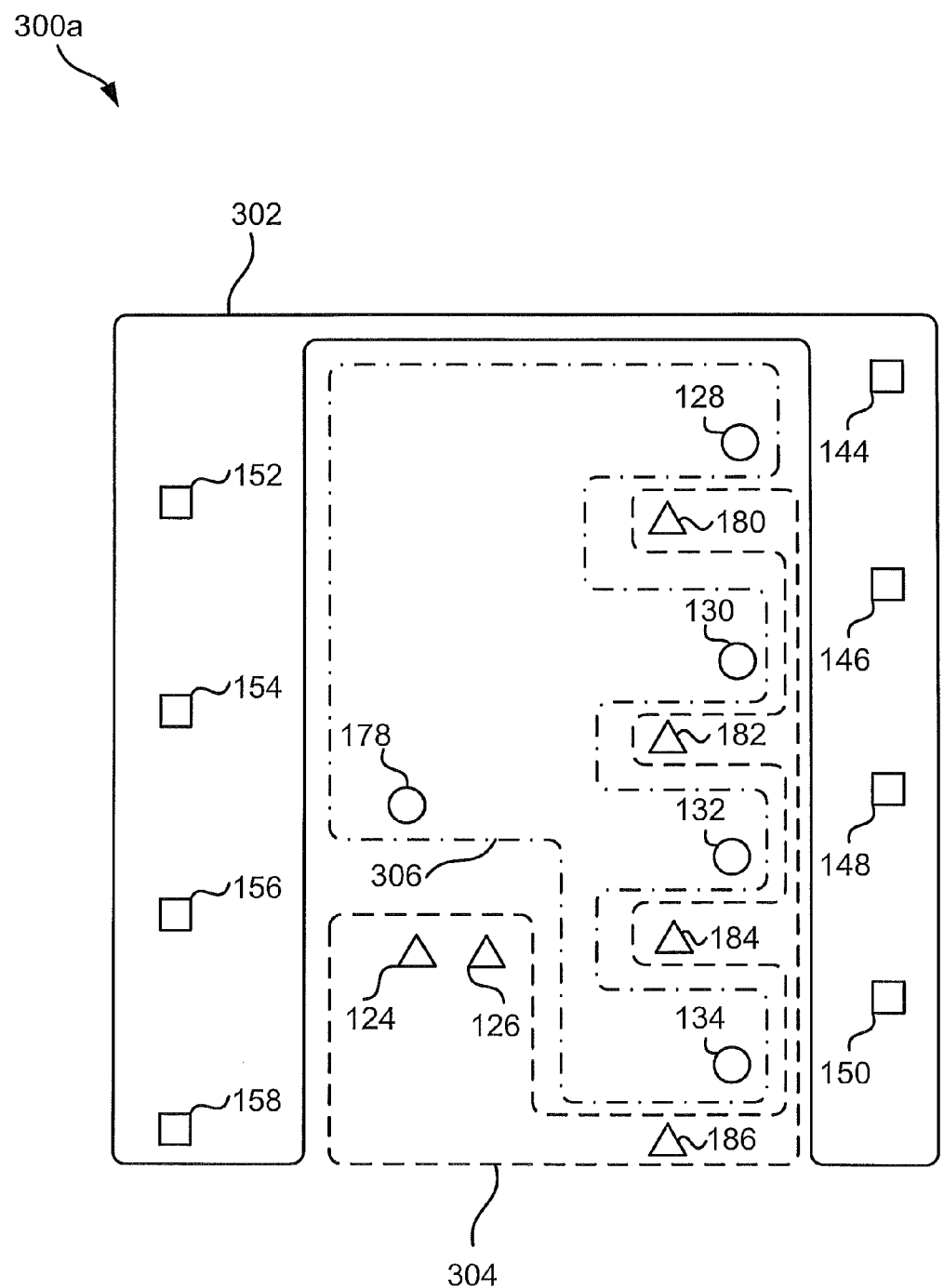
FIG. 3a is a schematic view of control devices according to an embodiment.

FIG. 3a is a schematic view of a control system 300a comprising control devices 124, 126, 128, 130, 132, 134, 144, 146, 148, 150, 152, 154, 156, 158, 178, 180, 182, 184, 186 according to an embodiment. The control devices 124, 126, 128, 130, 132, 134, 144, 146, 148, 150, 152, 154, 156, 158, 178, 180, 182, 184, 186 may be similar to the control devices 124, 126, 128, 130, 132, 134, 144, 146, 148, 150, 152, 154, 156, 158, 178, 180, 182, 184, 186, 202, 204, 218, 220, 222, 236, 238, 240, 242, 260, 262 of FIGS. 1a-b and 2a-d as disclosed above.

In the exemplary illustration of FIG. 3a the control devices have been grouped into subsets of control devices as schematically illustrated by the reference numerals 302, 304, 306. That is, a first subset is formed by control devices 144, 146,

148, 150, 152, 154, 156 and 158. A second subset is formed by control devices 124, 126, 180, 182, 184 and 186. A third subset is formed by control devices 128, 130, 132, 134 and 178. The subsets 302, 304, 306 may be either input subsets, output subsets, or both.

As stated above, each control device may be associated with at least one object. Thus, each subset comprises at least one object. For example, the first subset 302 of control devices may be associated with a control functionality associated with the windows 136, 138, 140, 142, 160, 162, 164, 166 of FIG. 1a. The second subset 304 of control devices may be associated with a control functionality associated with the rooms 102, 104, 106, 108, 110, 112 of FIG. 1a. The third subset 306 of control devices may be associated with a control functionality associated with the doors 168, 170, 172, 174, 176 of FIG. 1a.

For example, subset 304 may act as an output subset arranged to provide input to the subset 302. For example, assume that the control devices 124, 126, 180, 182, 184, 186 are associated with a temperature functionality and that the control devices 144, 146, 148, 150, 152, 154, 156, 158 are associated with a window functionality. In case one of the control devices 128, 130, 132, 134, 178 detects that the temperature in one of the rooms 102, 104, 106, 108, 110, 112 is higher than a predefined threshold an output signal "t_value" may be set to the value 1. This output signal value is communicated to all subsets which input parameters are associated with the parameter "t_value". Assume that the subset 302 has an input parameter associated with the output parameter "t_value" of the subset 304. The subset 302 thus receives information regarding the parameter "t_value". Upon receiving information of the parameter "t_value" the control devices of the subset 302 may take an action. For example, if the input signal is equal to 1 (which, as stated above, in this illustrative example indicates a detected temperature to be higher than a threshold value), a proper action may be to lower the blinds of one or more of the windows 136, 138, 140, 142, 160, 162, 164, 166 associated with the control devices 144, 146, 148, 150, 152, 154, 156, 158.

Figure 3B:
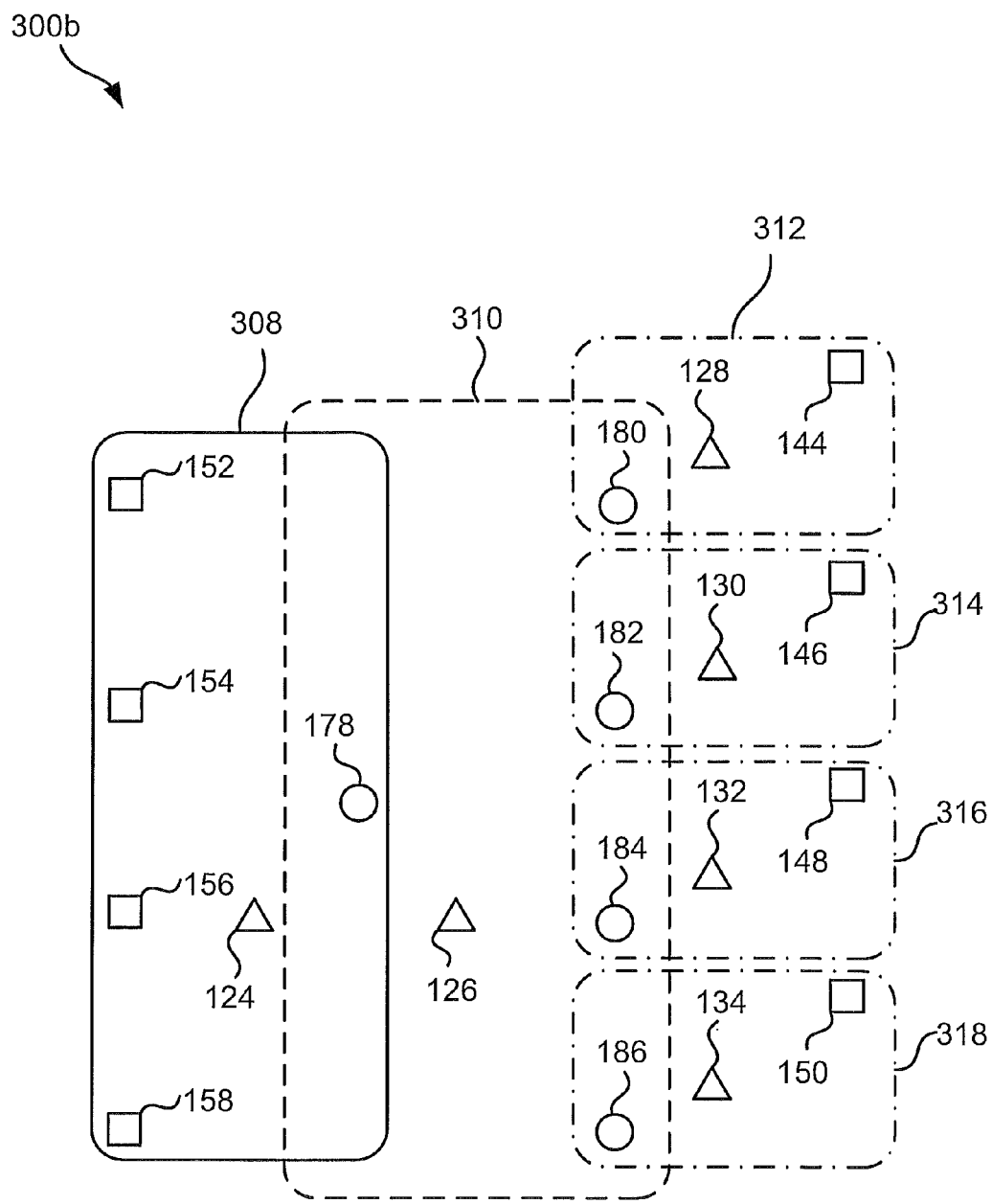
FIG. 3b is a schematic view of control devices according to an embodiment.

FIG. 3b provides a further example of a control system 300b similar to the control system 300a as disclosed above, wherein the control system 300b comprises control devices 124, 126, 128, 130, 132, 134, 144, 146, 148, 150, 152, 154, 156, 158, 178, 180, 182, 184, 186. In the illustrative example of FIG. 3b the control system 300b is associated with subsets 308, 310, 312, 314, 316, 318. According to this example the subsets are partly overlapping. With reference to the floor plan 100a of FIG. 1a each subset 308, 310, 312, 314, 316, 318 corresponds to a room 102, 104, 106, 108, 110, 112. Thus the output associated with each subset may pertain to one or more parameters associated with each room. Similarly the input associated with each subset may pertain to an action to be performed on all control devices in a particular room.

Figure 4:
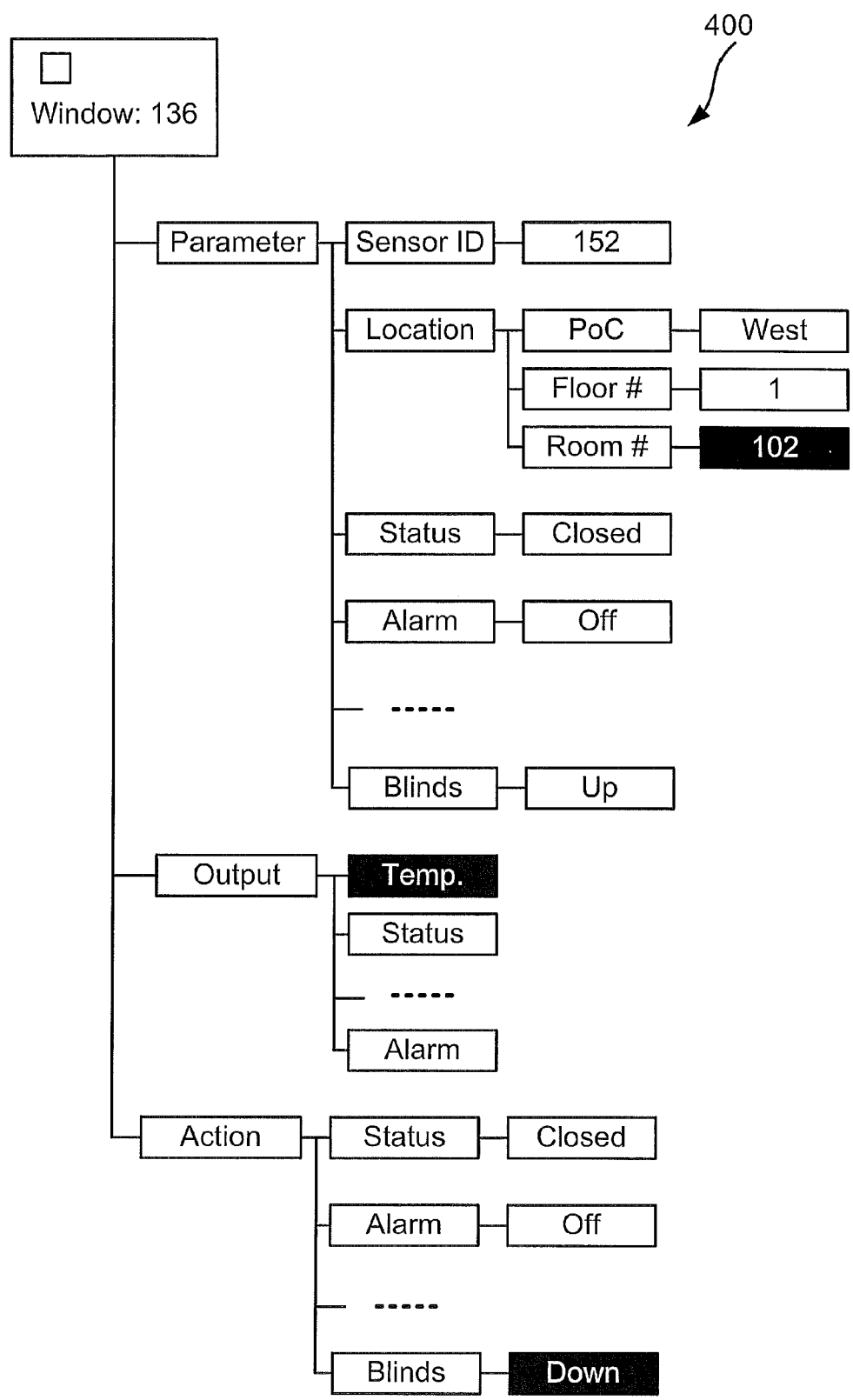
FIG. 4 is a schematic illustration of an object data structure according to an embodiment.

FIG. 4 is a schematic illustration of an object data structure 400 according to an embodiment. The object data structure 400 may thus be associated with a control device, such as the control devices 124, 126, 128, 130, 132, 134, 144, 146, 148, 150, 152, 154, 156, 158, 178, 180, 182, 184, 186, 202, 204, 218, 220, 222, 236, 238, 240, 242, 260, 262 of FIGS. 1a-b, 2a-d and 3a-3b as disclosed above. The object data structure 400 may further be associated with a location or functionality. In the example of FIG. 4 the object data structure is associated with the window 136 of FIG. 1 as indicated by the field reading "Window 136". The object data structure may further be associated with one or more parameters, as indicated by the field "Parameter", one or more outputs, as indicated by the field "Output", and one or more actions to be performed, as indicated by the field "Action".

Alternatively the object data structure may only be associated with outputs and hence not with inputs or actions. Thus the object data structure 400 is provided as an example for illustrative purposes only.

The field "Parameter" may be associated with one or more parameters. In the illustrative example of FIG. 4 the object data structure 400 is associated with the parameters "Sensor ID", "Location", "Status", "Alarm", "Blinds". The parameter "Sensor ID" may pertain to identification information of a control device associated with the object data structure. In the illustrative example of FIG. 4 the identification information takes the value "152" which corresponds to the control device 152 of FIGS. 1a-b. The parameter "Location" may inter alia pertain to point-of-compass, floor number and room number as indicated by the fields "PoC", "Floor #" and "Room #". In the illustrative example of FIG. 4 the associated control device 152 is located in a west-facing room in room 102 of the second floor. The parameter "Status" may inter alia pertain to a property of the object to be controlled by the associated control device. In the illustrative example of FIG. 4 the associated window 136 is closed. The parameter "Alarm" may inter alia pertain to an alarm property of the object to be controlled by the associated control device. In the illustrative example of FIG. 4 the alarm is switched off. The parameter "Blinds" pertains to whether or not blinds associated with the window 136 are up or down. In the illustrative example of FIG. 4 the blinds are up.

The field "Output" may be associated with one or more outputs. In the illustrative example of FIG. 4 the object data structure 400 is associated with the outputs "Temp.", "Status", "Alarm". The output "Temp." may pertain to a temperature value provided by a sensor associated with the control device 152. The output "Status" may correspond to the parameter "Status". The output "Alarm" may pertain to the parameter "Alarm".

The field "Action" may be associated with one or more actions to be performed by the control device 152 and/or the window 136. In the illustrative example of FIG. 4 the "Status" should be set to "Closed", the "Alarm" to "Off" and the blinds to "Down". As is understood by the skilled person these are just a few possible parameters, inputs and actions which may be associated with the object data structure.

The values of the parameters, inputs and actions of the data structure 400 of FIG. 4 may correspond to a situation in which the output "Temp." from the room "102" indicates that the temperature in room "102" exceeds a predefined threshold value. This information may then represent output from a first subset to be transmitted to define input to a second subset, wherein the input defines an action, which action comprises switching the blinds of window 136 in room "102" down. Thus in this illustrative example the second subset is at least partly overlapping the first subset.

Figure 5:
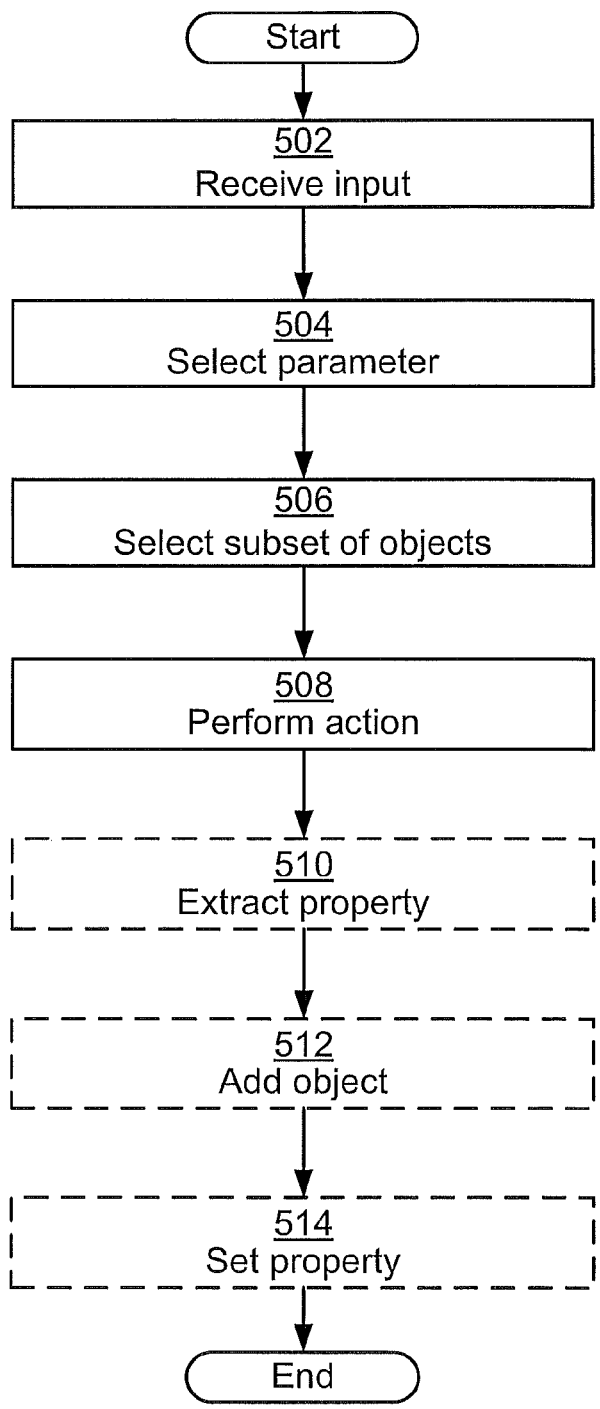
FIG. 5 is a flowchart according to an embodiment.

FIG. 5 is a flowchart according to an embodiment illustrating a method for controlling parameters of objects in a building control system. The method comprises in a step 502 receiving input from at least one of said objects, wherein said at least one object is associated with a first subset of objects. Further, selecting, in a step 504, at least one parameter, wherein said at least one parameter depends on said input. Furthermore, selecting, in a step 506, a second subset of objects from said objects, wherein said objects of said second subset are selected based on said at least one selected parameter; and performing, in a step 508, a first action on objects in said second subset of objects.

The method may further comprise, in a step 510, extracting an object property of said second subset of objects, in a step 512 adding a new object to said second subset of objects, and in a step 514 setting at least one object property of said new object to be equal to said extracted object property.

In the following, typical scenarios wherein the disclosed subject-matter may apply will be disclosed.

EXAMPLE 1

A HVAC zone. A HVAC zone may typically comprise a plurality of climate control devices, lighting devices, and so on. To improve energy efficiency it may be beneficial if the EAC system easily can set a mode of the HVAC zone, wherein the mode may pertain to associating temperature, ventilation, lighting, and so on with the presence of one or more persons in the HVAC zone. If the EAC system is arranged to detect and report a person entering the HVAC zone the HVAC zone should preferably be associated with an occupied mode. The occupied mode may comprise automatically switching lighting devices on, adjusting set-points of heating and ventilation, and so on. Similarly, in case the EAC system detects and reports that there are no persons present in the HVAC zone a controller of the HVAC zone should automatically switch lighting devices off. In the latter case the HVAC zone should have input variables that effect inputs of objects comprised in the HVAC zone. A logical filter for Example 1 may comprise all variables that are associated with occupancy mode in all types of objects in the zone. Pseudo-code of an algorithm for an associated action to be performed may be: "if input>0 then switch lights on".

EXAMPLE 2

An intrusion zone. An intrusion zone may typically comprise a number of glass breaking sensors, occupancy sensors, and the like. If the intrusion zone is set to an armed mode, an alarm of the zone should be triggered if any of the sensors detects the presence of an unauthorized person entering the intrusion zone. The function of the zone in this example is thus to collect the value and reliability for the arbitrary number of sensors that are selected to be in the specific zone. To allow for easy and efficient engineering it should be possible to add and remove sensors to/from the zone without affecting the behaviour of the zone. That is, if a new sensor is added to the zone it should automatically inherit properties, parameters and behaviour of other sensors in the zone. A logical filter for Example 2 may comprise variables that are associated with glass breaking in all types of objects in the zone. Pseudo-code of an algorithm for an associated action to be performed may be: "if input>0 then set alarm on".

EXAMPLE 3

An EAC zone. An EAC zone may typically comprise a number of doors. To allow for functions like area lockdown, all doors should typically be associated with the same properties, parameters and behaviour. An input variable to the zone would typically pertain to lock or unlock some or all doors of the zone. A logical filter for Example 3 may comprise variables that are associated with persons passing through the doors of the zone. A typical action may pertain to unlocking or looking the doors in the zone. Pseudo-code of an algorithm for an associated action to be performed may thus be: "if input>0 then unlock".

It will be appreciated that a person skilled in the art can modify the above-described embodiments in many ways and still use the advantages of the invention as shown in the embodiments above. Thus, the invention should not be limited to the shown embodiments but should only be defined by the appended claims.

The invention claimed is:

1. A method for controlling parameters of objects in a building control system, comprising
   receiving, by a logical filter, input from at least one of said objects, wherein said at least one object is associated with a first subset of objects, said first subset being determined by said logical filter based on at least one of geographic location, and control functionality;
   selecting at least one parameter, wherein said at least one parameter depends on said input of said logical filter;
   determining, by said logical filter and based on said at least one selected parameter, a second subset of objects from said objects;
   transmitting an output value of said first subset being associated with said at least one selected parameter and defining a first action to be performed to said second subset, and
   performing said first action on objects in said second subset of objects.

2. The method according to claim 1, further comprising
   extracting an object property of said second subset of objects;
   adding a new object to said second subset of objects; and
   setting at least one object property of said new object to be equal to an extracted object property.

3. The method according to claim 2, wherein said at least one object property pertains to at least one of an object input signal and an object output signal.

4. The method according to claim 2, wherein performing said first action further comprises selecting said first action, and wherein selecting said first action depends on said input.

5. The method according to claim 2, wherein said first action comprises assigning a value to an output of said at least one object in said second subset of objects.

6. The method according to claim 2, further comprising performing a second action on at least one object in said second subset of objects, wherein said second action is different from said first action.

7. The method according to claim 2, wherein each object is associated with a control device.

8. The method according to claim 1, wherein performing said first action further comprises selecting said first action, and wherein selecting said first action depends on said input.

9. The method according to claim 1, wherein said first action comprises assigning a value to an output of said at least one object in said second subset of objects.

10. The method according to claim 1, further comprising performing a second action on at least one object in said second subset of objects, wherein said second action is different from said first action.

11. The method according to claim 1, wherein said control functionality pertains to at least one of heating ventilation and air conditioning, electronic access control, and intrusion detection functionality.

12. The method according to claim 1, wherein each object is associated with a control device.

13. A computer program stored on a computer readable medium, comprising software instructions that, when executed in a computer, performs a method according to claim 1.

14. An apparatus for controlling parameters of objects in a building control system, comprising a receiver for, by a logical filter, receiving input from at least one of said objects, wherein said at least one object is associated with a first subset of objects, said first subset being determined by said logical filter based on at least one of geographic location, and control functionality;

a processor for, by said logical filter selecting at least one parameter, wherein said at least one parameter depends on said input of said logical filter;

said processor is further configured to, by said logical filter, select a second subset of objects based on said at least one selected parameter; and said processor is further configured to perform a first action on objects in said second subset of objects.

15. The apparatus according to claim 14, wherein said processor is further configured to extracting an object property of said second subset of objects;

detecting presence of a new object in said second subset of objects; and defining at least one object property of said new object to be an extracted object property.

16. The apparatus according to claim 15, further comprising a user input receiver for receiving input from a user, wherein said input pertains to said selecting said parameter, and wherein said user input receiver is further configured to providing said processor with instructions to said selecting said parameter.

17. The apparatus according to claim 14, further comprising a user input receiver for receiving input from a user, wherein said input pertains to said selecting said parameter, and wherein said user input receiver is further configured to providing said processor with instructions to said selecting said parameter.

* * * * *